(12) United States Patent
Petitpierre

(10) Patent No.: US 8,466,579 B2
(45) Date of Patent: Jun. 18, 2013

(54) AIRCRAFT SEAT WITH SHARED CONTROL ARCHITECTURE

(75) Inventor: Jean-Luc Petitpierre, Vieu d'Izenave (FR)

(73) Assignee: SiT (FR)

( * ) Notice: Subject to any disclaimer, the term of this patent is extended or adjusted under 35 U.S.C. 154(b) by 871 days.

(21) Appl. No.: 12/083,524

(22) PCT Filed: Oct. 13, 2006

(86) PCT No.: PCT/FR2006/051032
§ 371 (c)(1),
(2), (4) Date: Aug. 31, 2009

(87) PCT Pub. No.: WO2007/042740
PCT Pub. Date: Apr. 19, 2007

(65) Prior Publication Data
US 2010/0032999 A1 Feb. 11, 2010

(30) Foreign Application Priority Data
Oct. 13, 2005 (FR) ...................................... 05 53118

(51) Int. Cl.
*B60L 1/00* (2006.01)
(52) U.S. Cl.
USPC .......................................................... 307/9.1

(58) Field of Classification Search
USPC .......................................................... 307/9.1
See application file for complete search history.

(56) References Cited

U.S. PATENT DOCUMENTS

| | | | |
|---|---|---|---|
| 6,058,288 A | 5/2000 | Reed et al. | |
| 7,177,638 B2 | 2/2007 | Funderburk et al. | |
| 8,283,801 B2 | 10/2012 | Petitpierre | |
| 2002/0109647 A1 | 8/2002 | Crandall et al. | |
| 2005/0195561 A1 * | 9/2005 | Smith | 361/683 |

FOREIGN PATENT DOCUMENTS

| | | |
|---|---|---|
| EP | 1560311 A1 | 8/2005 |
| FR | 2817810 A1 | 6/2002 |
| WO | WO-88/04566 A1 | 6/1988 |
| WO | WO-03045780 A1 | 6/2003 |

* cited by examiner

*Primary Examiner* — Robert L. Deberadinis
(74) *Attorney, Agent, or Firm* — Dean W. Russell; Kilpatrick Townsend & Stockton LLP

(57) ABSTRACT

The invention essentially concerns an aircraft seat (1), comprising control units (17.2, 22.2, 27), at least one node (11-15) to execute a particular action or function, and a display (22.1) for viewing video data. Said node (11-15) and said display (22.1) are capable of being actuated by the control units (17.2, 22.2, 27). A keyboard (17.1) for transmitting a command signal addressed to the control units (17.2, 22.2, 27) is connected to said control units (17.2, 22.2, 27). The control units are shared between the display (22.1), the key board (17.1) and the node (11-15).

17 Claims, 2 Drawing Sheets

AIRCRAFT SEAT WITH SHARED CONTROL ARCHITECTURE

RELATED APPLICATIONS

This application claims priority from PCT/FR2006/051032 filed Oct. 13, 2006 and French application No. FR 05 53118 filed Oct. 13, 2005, both incorporated by reference in their entireties.

TECHNICAL FIELD

The present invention concerns an aircraft seat with shared control architecture. The invention is aimed especially at limiting the number of electrical connections between the pieces of equipment of this seat. The invention finds particularly advantageous application in the field of airline seats but can also be applied in the field of automobile seats.

BACKGROUND OF THE INVENTION

The fact that non-stop flight times are getting longer requires that passengers be provided with the maximum comfort by being offered the possibility of working, relaxing or even resting. This is the main reason why first-class seats or business-class seats are equipped with electromechanical actuators, such as motors, making it possible to obtain every position from that of an armchair to that of a bed. This is also why the passenger today has at his disposal a video screen, a telephone, a reading light and increasing numbers of information technology tools.

A control unit is used to control the screen and the other elements of the seat, such as the actuators or the reading light, which are capable of fulfilling a defined function. These seat elements, other than the screen, controlled by the control unit, are called nodes and generally form a network. The passenger can activate a node or the screen by means of a keyboard linked to the control unit.

In a traditional configuration, each position of a seat comprises a control unit in the form of a box. From this box emerge, in a star pattern, as many cables as there are nodes that have to be made to work and that have to be controlled. The fact that this control unit is situated beneath the seat gives rise to many cables which, with the box, take all the space available under this seat. These cables burden the structure of the seat and give rise to malfunctions.

In another configuration, a control unit common to several seats, and electronic modules offset in each node are connected to one another by means of a CAN type multiplexed node. The wiring of the seat is thereby considerably lightened. However, a group of several seats can happen to be deprived of node functions in the event of a malfunctioning in a central processing unit.

In another configuration, such as the one described in the patent application FR-2817810, each seat has a central processing unit connected to the nodes of the seat by means of a CAN type multiplexed electrical network. A system of this kind limits the risks of malfunctioning of a seat unit when a central processing unit is defective. However, the number of cables under the seat remains great.

SUMMARY AND OBJECT OF THE INVENTION

The invention proposes specially to limit the number of electrical links of the seat while at the same time making this seat autonomous.

To this end, in the invention, a control unit of the nodes is shifted to the keyboard, this control unit being connected to the nodes by means of a CAN type multiplexed network. Each of the nodes has control circuits to communicate with the control unit. Furthermore, a control unit of the screen is shifted in this screen, this control unit being connected to the other control units of the screen via a high-bit-rate network, of the Ethernet type for example.

Thus, in one embodiment, the control unit of the nodes and the keyboard are placed within one and the same pack, this pack being placed example in an armrest of the seat. And the control unit of the screen and the screen are placed inside one and the same pack, this control unit being situated behind the screen. Thus, the number of electrical links is limited by eliminating a first link between the control unit for the nodes and the keyboard and a second link Furthermore, there is redundancy between certain programs and certain pieces of data of the different control units in order to ensure minimum comfort for the passenger in the event of malfunctioning of one of the units. Indeed, the control unit for the nodes is capable of controlling the screen in the event of dysfunction of the screen control unit. And the screen control unit is capable of controlling certain nodes in the event of dysfunction of the node controlling unit.

Furthermore, the control unit of the screen comprises a memory for the storage therein of films and pieces of music offered to the passenger. In a particular embodiment, this control unit is connected to the high-bit-rate network through a radio link device in order to receive video data sent out by a single portable radio player/recorder device itself also connected to the high-bit-rate network.

In a particular embodiment, the power source that feeds the nodes and a switch that connects the control unit to the other control unit of the aircraft are placed inside a same pack, this pack being placed in a frame of the seat.

In another embodiment, the seat has a camera to detect the presence of a passenger in its seat.

The invention also relates to an aircraft seat comprising:
at least one node to perform a particular action or fulfill a particular function,
a first control unit comprising means to actuate the node, and
a keyboard to send out an instruction signal to the first control unit,
characterized in that:
this first control unit, the node and the keyboard are connected to one another by means of a multiplexed communications bus;
this first control unit being borne by the keyboard and being positioned behind this keyboard, this first control unit and this keyboard being situated inside one and the same first pack, The invention also relates to an aircraft seat comprising:
a screen to display video information, and
a control unit comprising means to control the screen, characterized in that:
this control unit is borne by the screen and positioned behind the screen, this second control unit and this screen being situated within one and the same pack,
this control unit comprises video and/or audio data in its memory.

BRIEF DESCRIPTION OF THE DRAWINGS

The invention will be understood more clearly from the following description and from the accompanying figures.

These figures are given purely by way of an illustration and in no way restrict the scope of the invention.

DETAILED DESCRIPTION OF THE EMBODIMENTS

The elements common to several figures keep the same reference from one reference to another.

Figure 1:
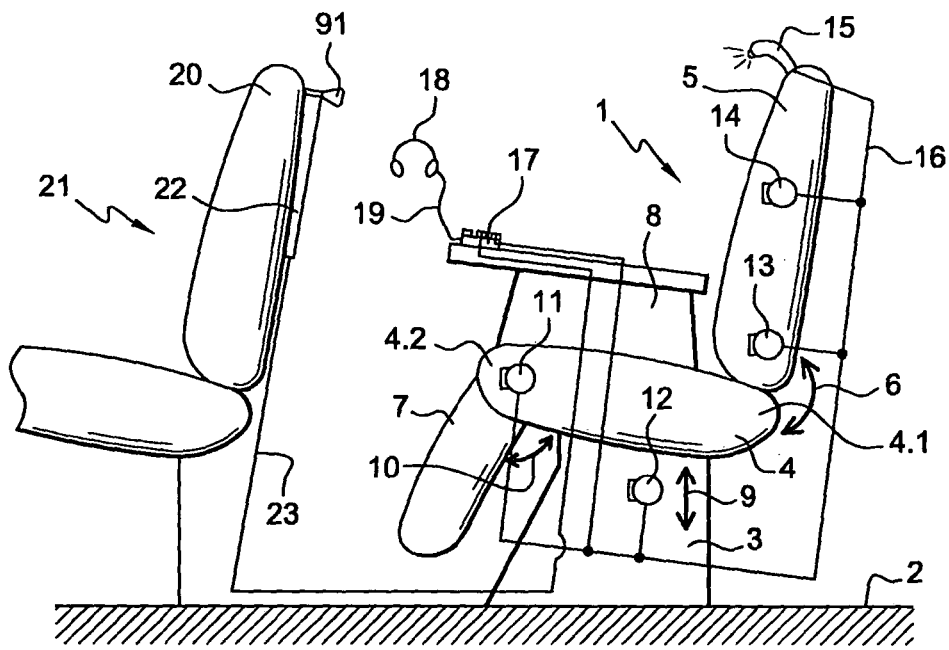
FIG. 1 is a schematic view of the seat according to the invention comprising nodes, a screen and a keyboard within which control units are situated.

FIG. 1 shows a seat attached to a floor 2 of an aircraft by means of a base 3 comprising two fastening legs. This base 3 is generally hooked to rails (not shown) which extend parallel to each other on the floor 2.

This seat 1 has a seating 4 which is on the whole parallel to the plane of the floor 2. The seating 4 is mobile in translation relative to the floor 2 in a vertical direction, along the arrow 9. The movement in translation of the seating 4 enables the passenger to adjust it to his height.

A seat back 5 is hooked to one end 4.1 of the seating 4. This seat back 5 is mobile in rotation along the arrow 6, about an axis perpendicular to the sheet which passes through the end 4.1. The seat back 5 is capable of passing from a horizontal position to a vertical position, and vice versa.

Furthermore, an arm-rest 8 is fastened to one side of the seating 4 so as to be situated above the seating 4. As a variant, this arm-rest 8 is hooked to one side of the seat back 5.

A foot-rest 7 is fastened to one end 4.2 of the seating 4 opposite the end 4.1. This foot-rest 7 is mobile in rotation, along the arrow 10, about an axis perpendicular to the sheet which passes through the end 4.2. This foot-rest 7 is capable of passing from a vertical position to a horizontal position and vice versa.

To enable the different parts of the seat to move relative to one another, the seat 1 has electromechanical actuators 11-14, such as dc motors. These actuators 11-14 provide respectively for the rotational shifting of the foot-rest 7, the shifting in translation of the seating 4, the rotational shifting of the seat back 5. Furthermore, the seat 1 has an actuator 14 that provides for massaging the passenger's back. The seat also has a reading light 15 fastened for example to the top of the seat back 5.

The actuators 11-14 and the seat back 15 form the nodes of a CAN type network. Indeed, these nodes are connected to one another by means of an CAN type bus 16. As a variant, other nodes, such as other actuators or sensors, can be connected to this network. This number of nodes is limited by a bit rate of the CAN network which is typically 125 kbits/s.

Furthermore, a pack 17 is connected to the bus 16. This pack 17 comprises a first control unit and a keyboard, the first control unit being integrated into the keyboard. This first control unit 17 may be situated for example behind the keyboard and may be placed directly against it so that a plane of the keyboard and this control unit are parallel to each other. As a variant, when the control unit 17 is placed in the arm-rest 8 of the seat, it is situated perpendicularly to a plane of the keyboard.

This pack 17 controls an actuation of the different nodes 11-15 of the network. The control unit of the pack 17 is active, sending instructions to be executed or information requests to the different nodes 11-15, while the nodes 11-15 are passive, sending out information signals or performing actions at the request of the control unit. To this end, the nodes 11-15 each comprise a control unit to communicate with the control unit of the pack 17.

In one particular embodiment, the pack 17 is placed in the arm-rest 8. As a variant, the pack 17 is a pull-out pack and is attached to a seat back 20 of a front seat 21 situated facing the seat 1. With a pull-out pack of this kind, the passenger can access the different keys of the keyboard, even when he is in a reclining position. These keys are mechanical and/or touch keys and may take the form of a wheel.

Furthermore, a pack 22 is placed on the back of the seat back 20. This pack 22 has an LCD type screen for example, and a second control unit which manages this screen. This second control unit is placed flat against the back of the screen so as to form a single-piece unit with the screen.

In a particular embodiment, the pack 22 communicates with the pack 17 by means of a high-bit-rate link 22 connected to a common Ethernet bus (not shown) of the aircraft. This bus is connected to the Internet, for example by means of a router.

Generally, a headset-microphone unit 18 is connected to the pack 17 by means of an audio type link 19. This unit 18 enables the passenger to listen to the music or soundtrack of a film stored, as shall be seen, in a memory of the pack 17 or 22.

As a variant, instead of being in the same pack, the node control unit is placed in a receptacle that receives a pack of the keyboard. And the control unit of the screen is placed in another receptacle that receives a pack of the screen.

Figure 2:
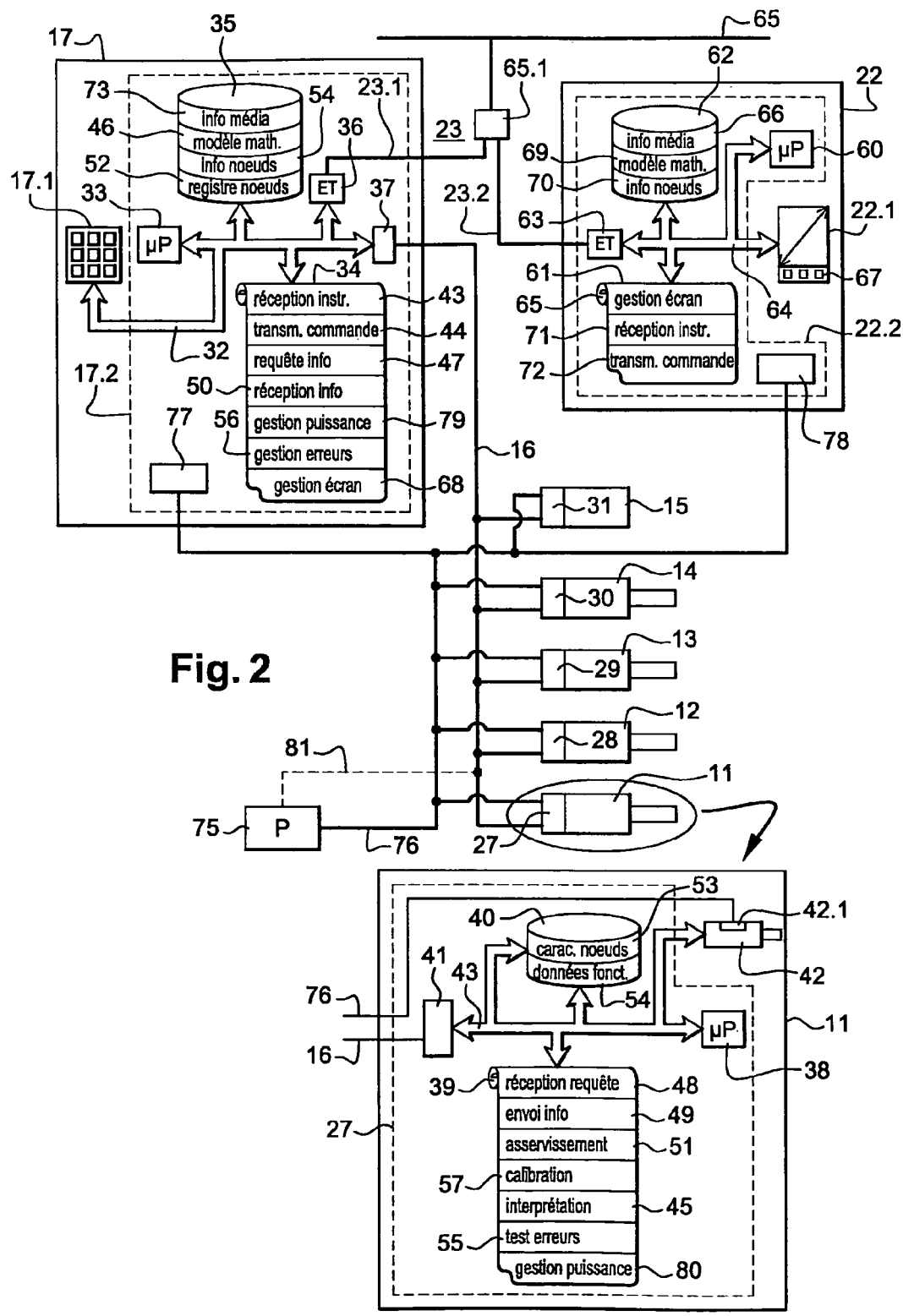
FIG. 2 is a more detailed schematic view of the links between the control units, the nodes and the screen of a seat according to the invention.

FIG. 2 provides a detailed schematic view of the different elements of the seat 1 and of the links between them. More specifically, the nodes 11-15 are connected to the CAN bus, each by means of a CAN interface 27-31, enabling the nodes 11-15 to communicate with each other and with the pack 17 through the bus 16.

This pack 17 comprises the keyboard 17.1 and the control unit 17.2 which controls the nodes 11-15. More specifically, this control unit 17.2 has a microprocessor 33, a program memory 34, a data memory 35, an Ethernet interface 36 and a CAN interface 37 connected to one another and to the keyboard 17.1 through an internal bus 32. The CAN interface 37 is used especially to receive data sent by the nodes 11-15 and to send data to these nodes 11-15 through the bus 16. To this end, this interface 37 provides especially for a serialization and de-serialization of data on the bus 16.

Furthermore, as in the case of the node 11, each node 11-15 has a control unit 27. This control unit 27 comprises a microprocessor 38, program memory 39, a data memory 40, a CAN interface 41 and an activatable element 42 such as a direct current motor. These circuits 38-42 connected to one another through an internal bus 43. The CAN interface 41 is used to receive data sent out by the control unit 17.2 and send out data to this control unit 17.2 through the bus 16. To this end, this interface 41 provides especially for the serialization and the de-serialization of data on the bus 16.

In one particular embodiment, the control unit 17.2 executes a program 43 and awaits reception of an electrical signal from the keyboard 17.1. Upon reception of the signal, the control unit 17.2 executes a program 44 and sends instructions to a particular node 11-15 or to a set of nodes.

This node or these nodes 11-15, which receive the instruction in the form of a program for example, then execute a program 45 in which the instruction is interpreted. The control unit 27 of the node can then store the pieces of interpreted information in the memory 40 to execute them immediately or with a delay. The execution of these instructions causes, for example, an actuation of the element 42 which corresponds for example to a shifting of this element. The control unit 27 can control a shifting of the element 42 while at the same time achieving a feedback control over its position, this open-loop or closed-loop feedback control being defined through a program 51.

Furthermore, during a shifting of the seat 1, the control unit 17.2 can make state requests 47 to a node 11-15 to obtain knowledge especially of a position of its actuator 42. In executing the program 48, the node receives and interprets the state requests signals. The node then sends the requested pieces of information in executing the program 49. The control unit 17.2 then executes a program 50 to receive and process these pieces of state information. These pieces of state information generally sent by several nodes are processed by the control unit 17.2 by means of a mathematical model 46 in order to prevent the different actuators 11-14 of the seat from making the seat 1 take prohibited positions liable to inconvenience another passenger or positions in which the mechanical elements of the seat could be damaged.

When the system is powered on, the control unit 17.2 updates its register of nodes 52 in which it lists the number of nodes 11-15 connected to the CAN bus 16. The control unit 17.2 thus detects any addition of new nodes or removal of nodes. To this end, each node 11-15 has, in its memory, its characteristics 53 such as an identification number, which will be sent to the control unit 17.2 so that it can identify the type of node connected to the CAN network.

Furthermore, each node 11-15 has its operating characteristics in its memory 40, for example its furthest shifts, which it can transmit to the control unit 17.2. This control unit 17.2 is furthermore capable of keeping the operating information on the nodes in its memory 54 and can, if necessary, combine this information with the mathematical model 46.

Each node furthermore executes a program 55 to perform a test on whether the instructions sent by the control unit 17.2 have been correctly executed. In the event of dysfunction of a node, an error signal is sent to the control unit 17.2. This control unit 17.2 manages the error signals sent by the nodes in executing a program 56 and, as the case may be, sending an information signal to the passenger or hostess.

Each node may comprise a program 57 enabling the calibration of the element 42 at the time of its first connection to the CAN network. This calibration may enable the calibration, for example, of the travel of a thruster element of an actuator, or the luminosity of the reading light.

Furthermore, the pack 22, called a media pack, has a screen 22.1 and a control unit 22.2 which controls this screen 22.1. The control unit 22.2 has a microprocessor 60, a program memory 61, a data memory 62 and an Ethernet interface 63. These elements 60-63 are connected to one another and to the screen 22.1 by means of a bus 64.

The control circuit 22.2 executes a program 65 to carry out a management of the screen 22.1, especially its display. The actuation of the screen 22.1 is achieved by means of the keyboard 17.1 or by means of a tactile keyboard 67 of this screen 22.1.

The control unit 22.2 is connected to the control unit 17.2 by means of a switch or a network repeater 65.1. This element 65.1 is connected to a common Ethernet bus 65 of the aircraft to which all the control units of the seats are connected. More specifically, the Ethernet interface 36 of the control unit 17.2 and the Ethernet interface 63 of the control unit 22.2 are connected to the switch 65.1 respectively by means of a high-bit-rate link 23.1 and a high-bit-rate link 23.2. These high-bit-rate links may be RJ45 type wire links, optical links or radio links.

Through the common Ethernet bus 65, the passenger has access to the Internet and to musical or video data. However, in a preferred embodiment, the control unit 22.2 already has audio and video data 66 in its data memory 62. Thus, even when the control unit 22.2 is not connected to the bus 65, a passenger can view films on his screen. In one example, a space of 100 GB, 200 GB or more is available in the memory 62 for the storage of more than hundred films, compressed in the MPEG4 format for example and musical data compressed in the MP3 format for example. The transfer of the information from a common reader (not shown) connected to the bus 65 up to the memories of some or all the screens of the aircraft is done through the Ethernet network.

As a variant, this information transfer is achieved by radio, when the wire links of the Ethernet network are replaced by radio links of a WiFi type for example. In this case, the switch 65.1 is capable of sending and receiving radio signals to communicate with the player connected to the Ethernet bus 65. In one particular embodiment, the keyboard 17.1 also has a screen and items of video and audio information are transmitted to this screen via the Ethernet bus 65.

Furthermore, there is a redundancy of data and control programs so that, in the event of dysfunction of the control unit 22.2, the control unit 17.2 can manage the display of the screen 22.1. To this end, the control unit 17.2 comprises a program 68 and films 73 to control and transmit video information to the screen 22.1 via the Ethernet network. The memory 73 generally stores a smaller number of films than the memory 66.

Conversely, in the event of dysfunction of the control unit 17.2, the control unit 22.2 comprises at least one program 71 that enables it to listen to the command that the passenger may make through the keyboard 17.1 or the keyboard 22.1. And the unit 22.2 also has a pro-gram 72 to provide for the transmission of instructions to the nodes 11-15. This transmission of instructions to the nodes 11-15 may be done by means of the bus 65, the switch 65.1 and the interface 37.

As a variant, the control unit 22.2 comprises a CAN interface (not shown) connected to the bus 64 and to the CAN bus 16 to communicate with the nodes 11-15 of the network. Furthermore, the control unit 22.2 may also have the mathematical model 69 in memory for the control of the nodes and the information 70 on the number and type of nodes connected to the network 16.

In one particular embodiment, when the unit 22.2 controls the nodes, it is capable of performing only a limited number of actions such as for example making the seat 1 go from a reclining position to a sitting position. In the, it is essential that the passenger should return to a seated position during a landing.

As a variant, the unit 22.2 furthermore comprises an audiophonic module (not shown) linked to the bus 64 and to the headset/microphone unit 18. This module comprises a codec unit and can convert electrical sound signals into IP type packets. The control unit 22.2 can thus enable passengers to communicate with one another and with the exterior via the bus 65.

The seat 1 furthermore comprises a power source 75 which powers the nodes 11-15 and the control unit 17.2, 22.2 via a power bus 76 which generally delivers a 24V voltage. More specifically, the active elements of the nodes, such as the element 42, are connected to the network 76 by means of a power module 42.1. And the control unit 17.2 and 22.2 comprise power modules 77 and 78 connected to the network 76. In one embodiment, this power module 75 is treated as a node of the CAN network and is connected to this network by means of a link 81.

Furthermore, to ensure management of the values of power consumed by the different nodes 11-15, the control unit 17.1 executes a program 79 used to limit a speed or turn off one of the nodes when a value of total consumed power of the nodes reaches a determined threshold. Each node 11-15 can also comprise an internal power management program 80 enabling the distribution of the power between the different circuits of the node and, as the case may be, the different elements managed by the node. It is indeed possible for one and the same node to control several motors and/or several sensors for example.

As a variant, the set of programs and data of the control units may be stored without distinction in one or other of the memories of the above-mentioned seat control units.

As a variant, the nodes 11-15 do not comprise any control units 27. They then take the form of simple electronic actuators which do not comprise any embedded intelligence, i.e. they do not have any microprocessor or memory.

As a variant, only one control unit 17.2 or 22.2 controls the nodes 11-15 and the screen 22.1, the other unit being eliminated.

As a variant, the seat according to the invention comprises the nodes 11-15, and the control unit 17.2 for the control of these nodes but not the screen 22.1 or the control unit 22.2 of this screen. In another variant, the seat according to the invention comprises the screen 22.1 and its control units 22.2 but not the nodes 11-15 or the control unit 17.2 of these nodes 11-15.

Naturally, the different programs described may be replaced by dedicated electronic circuits.

Figure 3:
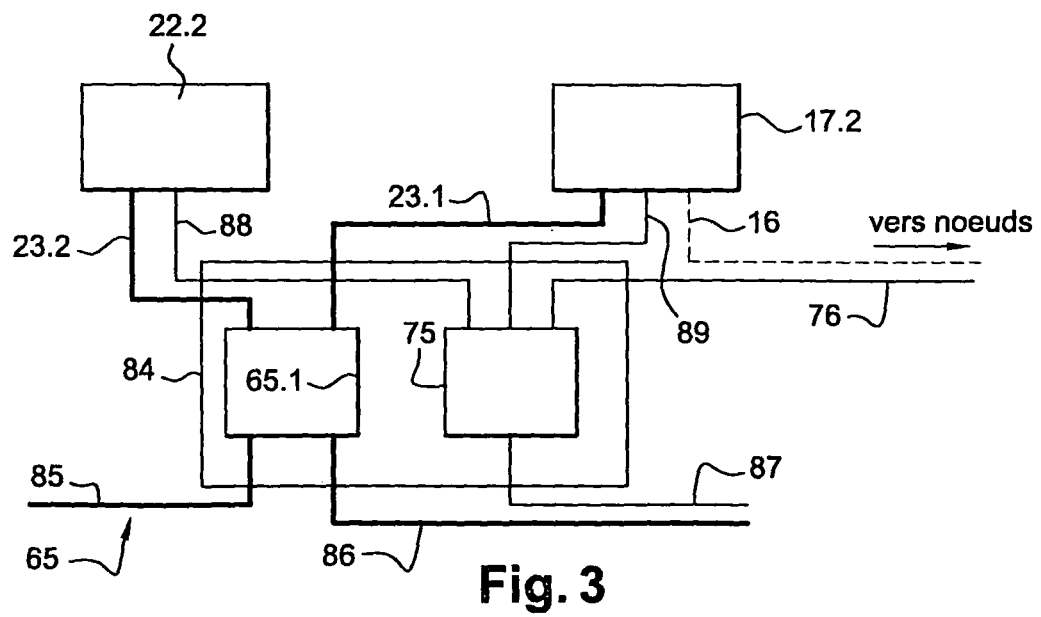
FIG. 3 is a schematic view of a pack according to the invention comprising a power source and a repeater for the high-bit-rate network.

FIG. 3 gives a detailed view of the links that may exist between the control unit 17.2 and 22.2, the switch 65.1 and the power module 75. The Ethernet links are represented by heavy lines, the power links are represented by fine lines and the CAN type links are represented by dashes.

FIG. 3 shows that the repeater 65.1 and the power source 75 are placed within one and the same pack 84. This pack 84 is located within a frame of the seat 1, for example in a foot of the base 3.

A connection 85 of the common Ethernet bus at 100 Mbits/s links another repeater (not shown) of another seat to the repeater 65.1. And a connection 86 connects the repeater 65.1 again to another repeater (not shown) of another seat. Furthermore, as we have seen, the two connections 23.1 and 23.2 connect the switch 65.1 respectively to the unit 17.2 and the unit 22.2. This architecture is repeated for each seat.

A power bus 87 is connected to the power source 75. An ac voltage of 115 V and frequency 400 Hz can be observed on this bus 87. The source 75 converts this ac voltage into a rectified and smoothened voltage of 24V, by means of a diode bridge and capacitors in particular. This 24V voltage is applied to the modules of the units 17.2 and 22.2 respectively via the links 88 and 89. And a 24V electrical signal is conveyed to the nodes 11-15 by means of the bus 76. As a variant, as we have seen, only the bus 76 powers the packs 17.2, 22.2 and the nodes 11-15.

The CAN bus 16 is connected to the control unit 17.2 and to the nodes 11-15 as already seen.

In one particular embodiment, the bus 16 and the power bus 76 are placed physically within a same carrier to reach the different nodes 11-15 of the CAN network. Furthermore, the power bus 86 and the Ethernet bus 65 are placed together within rails of the aircraft to which the seats are fastened. These buses 65 and 67 may thus power and connect the seats to one another and to the Ethernet network. Furthermore, the power bus is connected to a common generator (not shown) and the Ethernet bus is connected to a router to be connected to the Internet network.

In one particular embodiment, the seat one is provided with a digital camera 91 (shown in FIG. 1) which is fastened to an edge of the screen of the pack 22 or to the top of the front neighboring seat 21. A lens of this camera 91 is pointed towards the seat back 5 of the seat 1.

In a method of detection of the presence of a passenger according to the invention, a reference photo of the vacant seat is taken in a reference step by means of the camera 91. This reference photo is stored in the memory 35 of the control unit 22.2. Then, in the presence-determining step, an instantaneous photo is taken of the passenger's seat using the digital camera 91.

In a comparison step, the reference photo is compared with the instantaneous photo of the seat. If the instantaneous photo of the place is identical to the reference photo, then the signal corresponding to the absence of the passenger in his seat is sent out on the Ethernet bus 65 to a computer of the aircraft crew. However, if the instantaneous photo of the place is different from the reference photo, a signal corresponding to the presence of the passengers sent out to the computer of the crew's.

In one mode of implementation of the method, to make the comparison, a correlation is made between the reference photo and the instantaneous photo of the seat.

It is possible to take the instantaneous photo of the seat at regular intervals. If the comparison of the photos reveals the presence of the passenger for a borderline period, then a signal is sent out to this passenger to inform him that has not moved during this borderline duration. This implementation is used to prevent blood circulatory problems for passengers who have moved far too infrequently in the aircraft.

The invention claimed is:

1. An aircraft seat, comprising:
 at least one node for performing a predetermined action or fulfilling a predetermined function;
 a first control unit for actuating said at least one node;
 a keyboard for transmitting an instruction signal to the first control unit;
 a multiplexed communications bus for connecting the first control unit, said at least one node, and the keyboard; and
 a first pack housing the first control unit and the keyboard, the first control unit being in communication with the keyboard and positioned behind the keyboard.

2. The seat of claim 1, wherein said at least one node comprises a third control unit which is in communication with the first control unit.

3. The seat of claim 1, further comprising:
 a screen for displaying video information; and
 a second control unit for controlling the screen and connected to the first control unit via a high-bit-rate network; and
 a second pack housing the second control unit and the screen, the second control unit being in communication with the screen and positioned behind the screen.

4. The seat of claim 3, wherein the first control unit is operable to control the screen when the second control unit is inoperable.

5. The seat of claim 3, wherein the second control unit comprises video and audio data.

6. The seat of claim 5, wherein the first control unit comprises programs, video and audio data which can replace a limited number of programs, video and audio data of the second control unit when the second control unit is inoperable.

7. The seat of claim 3, wherein the second control unit is operable to control said at least one node when the first control unit is inoperable.

8. The seat of claim 7, wherein the second control unit comprises programs and data which can replace a limited number of programs and data of the first control unit when the first control unit is inoperable.

9. The seat of claim 8, wherein the second control unit comprises programs and data for controlling movement of the seat from a reclining position to a seated position.

10. The seat of claim 3, wherein the first and second control units are connected to the high-bit-rate network by a radio and each of the first and second control units comprises a memory for storing video data transmitted on the high-bit-rate network.

11. The seat of claim 3, further comprising a third pack housing a network repeater for connecting the first and second control units to the high-bit-rate network and a power source for powering said at least one node and the first and second control units.

12. The seat of claim 11, wherein the third pack is positioned within a frame of one of the legs of the seat.

13. The seat of claim 3, wherein the screen is positioned in the back of a front neighboring seat.

14. The seat of claim 3, further comprising a digital camera fastened to an edge of the screen or to the top of a front neighboring seat, and lens of the digital camera being pointed toward a seat back of the seat.

15. The seat of claim 3 in which the second control unit comprises a memory for storing video and audio data.

16. The seat of claim 15, wherein the second control unit is connected to a common player via the high-bit-rate network, thereby enabling the transfer of video and/or audio information from the common player to the second control unit.

17. The seat of claim 15, wherein the screen comprises a touch keyboard for actuating the screen.

* * * * *